May 30, 1939.  A. J. BRUGMA  2,160,582
CONTROL DEVICE
Filed May 17, 1937   2 Sheets-Sheet 1

INVENTOR:
ANTOINE JOHAN BRUGMA
BY Haseltine, Lake & Co.
ATTORNEYS

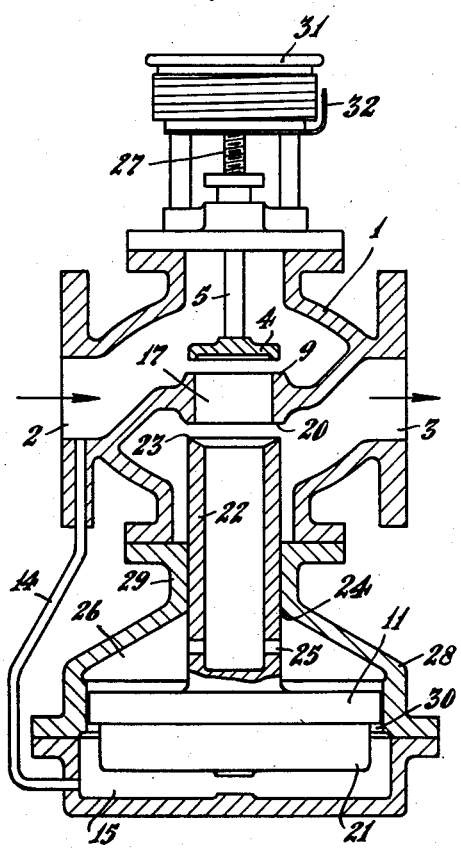

Patented May 30, 1939

2,160,582

UNITED STATES PATENT OFFICE 2,160,582

CONTROL DEVICE

Antoine Johan Brugma, The Hague, Netherlands

Application May 17, 1937, Serial No. 143,036
In the Netherlands May 28, 1936

5 Claims. (Cl. 137—152.5)

The invention relates to a control device comprising a manually adjustable valve and an automatic valve by means of which latter a second passage is controlled while the valve body of this automatic valve is connected with a piston which is subjected on the one side to the pressure prevailing in front of, and on the other side to the pressure prevailing behind the manually adjustable valve.

According to the present invention the operative surface of that part of said combined valve and piston, which is subjected to the pressure prevailing in the space situated in front of the manually adjustable valve, has the same or nearly the same area as the operative surface of that part of said combined member which is subjected to the pressure prevailing in the space behind the said valve, in such a way that the automatic valve will keep constant the quantity of liquid flowing through the device per unit of time.

By adjusting the manually operated valve it is possible to regulate the quantity of liquid flowing through the device per unit of time independently of the pressures prevailing in the inlet and outlet chambers.

The device is in the first place intended for liquids; under certain conditions it may, however, also be used for gases.

The invention will now be further explained with the aid of the drawings.

Figure 1:
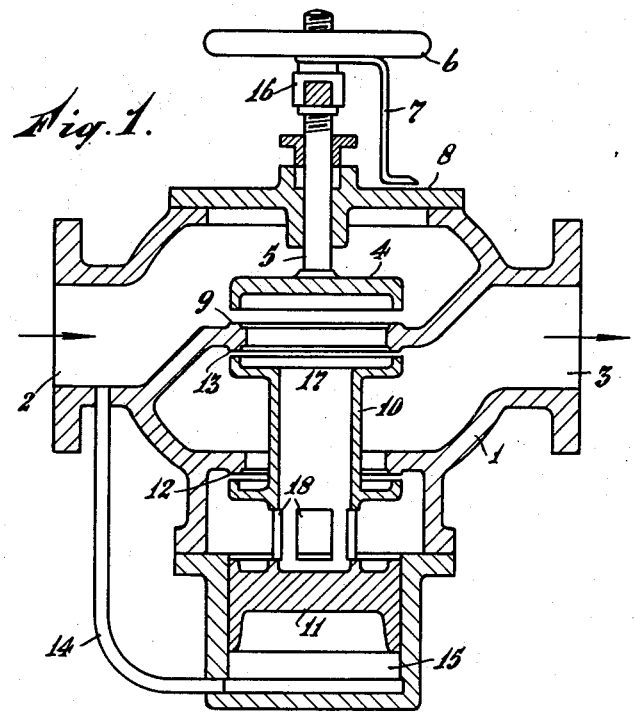
Figure 2:
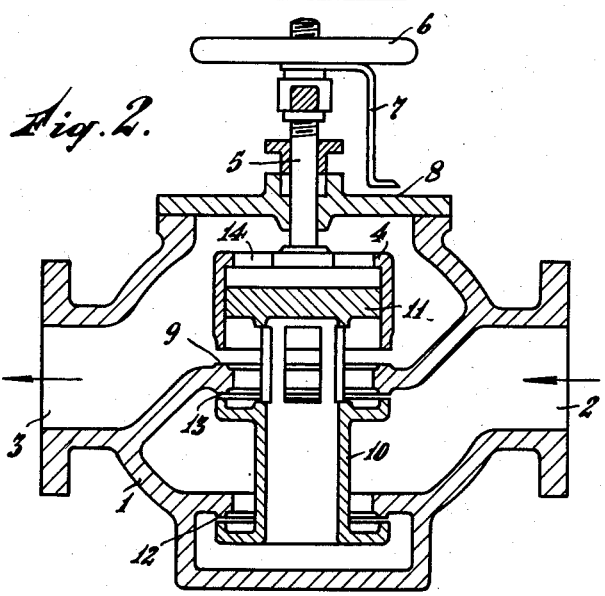

Figures 1, 2 and 3 illustrate three embodiments of the invention.

The apparatus comprises the casing 1 (Figs. 1, 2 and 3) with the inlet chamber 2 and the outlet chamber 3. The manually adjustable valve 4 is connected with the threaded spindle 5 on which there is provided the handwheel 6. A pointer 7 is provided on the handwheel 6 which pointer moves over a scale 8. In the closed position the adjusting valve 4 rests on the seat 9.

The automatic valve comprises the balanced valve body 10 and the piston 11 which are integral with each other. In the closed position this balanced valve is resting on the seats 12 and 13. In the embodiment according to Fig. 1 a pipe 14 connects the inlet chamber 2 with the space 15 at the bottom of the casing, whereas according to Fig. 2 the cylinder space above the piston 11 is in communication with the outlet chamber 3 by means of openings 14.

The apparatus according to Fig. 1 is operated as follows:

The liquid flowing into the apparatus at 2 will find its way to the outlet 3 passing through the slit between the throttled adjusting valve 4 and the seat 9 and moreover partly between the balanced valve 10 and the seat 13, and partly through the apertures 18 and between the balanced valve 10 and the seat 12. The liquid flowing between the adjustable valve 4 and the seat 9 will meet with a resistance manifesting itself by a difference in pressure between the inlet chamber 2 and the space 17, and since the chamber 2 is connected with the space 15 through the pipe 14, the same difference in pressure will exist between the spaces 15 and 17.

If the pressure in the inlet chamber 2 and in the space 15 is denoted by $P_1$, the pressure prevailing in the space 17 in front of the valve seats 12 and 13 by $P_2$ and the pressure in the outlet chamber 3, that is to say the presssure behind the seats 12 and 13, by $P_3$, it will be evident that the valve body 10 is balanced with regard to the pressure $P_2$ as well as with regard to the pressure $P_3$, since the two valve disks are congruent. Therefore the operative surface of the combined valve and piston on which the pressure $P_2$ is acting, is the upper surface of the piston 11, which surface has the same area as the bottom surface on which the inlet pressure $P_1$ is acting. Because of the difference in pressure $P_1$—$P_2$ the member consisting of the piston 11 and the balanced valve 10 will be subjected to an upwardly directed force which balances its weight which makes that the said member is continuously in a floating condition. If the flow of liquid by some cause or other shows a tendency to increase, the difference in pressure between the spaces 2 and 17, and consequently also between the spaces 15 and 17, will increase at first, causing the control member 10, 11 to rise, so that the flow of liquid is throttled by the balanced valve 10.

The reverse will occur when the flow of liquid shows a tendency to decrease. In order to keep the member 10, 11 in a floating condition a constantly upwardly directed force equivalent to the weight of said member is required. This constant force is supplied by the difference in pressure $P_1$—$P_2$ between the spaces 2 and 17 so that likewise this difference in pressure and with it the quantity of liquid flowing through the opening between the adjusting valve 4 and the seat 9, will be constant while its value will only be dependent on the predetermined position of the adjusting valve 4.

For the purpose of keeping the control member as free of friction as possible, the piston 11 may be made loosely fitting. The leakage along the piston caused thereby is only slight, since the difference in pressure at the two sides is but small and only sufficient for keeping the control member floating. This leakage moreover is constant, since the size of the leak and the difference in the pressures on both sides are constant, so that this leakage, which is constant in volume will exert no influence on the efficiency of the apparatus. When gauging the scale, this constant leakage is automatically taken into account.

It is evident that on account of the dynamic action of the flow of liquid the pressures prevailing at various points of the device may be different from those calculated according to the above mentioned purely static considerations.

Here the shaping of the device plays an important part. Good craftsmanship will demand a construction as favorable as possible, so that the dynamic action of the flow of liquid will not be detrimental to the efficiency of the device, but will promote the same as much as possible. For this purpose the device may be provided with various refinements which need not be discussed here, as they do not influence the principle of the invention.

A different embodiment of the invention is illustrated in Fig. 3.

The adjustment of the hand valve is made here by means of a helical graduated scale on the hand wheel 31, having the same pitch as the screw threading 27 on the spindle 5.

The helical line of the scale graduated by means of symbols and figures when rotated will in this manner always remain at the height of the point of the stationary pointer 32, at which point the position may be read off with particular exactitude.

The automatic control valve is balanced, but in this embodiment has only one valve edge. The hollow column 22 is provided at the top with the valve edge 23, while it is slidable in the cylindrical portion 29 of the intermediate piece 28. The piston 11 is loaded with a weight 21 connected to the same. The pressure in the space 17 is transmitted to the space 26 above the piston 11 through the hollow column 22 and the slits 25 provided in the same. In this manner the same or practically the same difference in pressure will prevail in the spaces 15 and 26 on either side of the piston 11, as in the spaces 2 and 17.

In order to prevent friction the piston 11 and the hollow column 22 may be constructed loosely fitting in the guides in the intermediate piece 28. The leakage caused thereby has no influence on the efficiency of the device, the leakage through the clearance 30 between the intermediate piece 28 and the piston 11 being controlled by a constant difference in pressure and consequently being also constant or practically constant. It is moreover immaterial for the efficiency of the apparatus in what manner the liquid flowing between the valve 4 and the seat 9 will divide into two flows, one of them passing between the valve edge 23 and the seat 20 and into a flow passing through the hollow column 22, the slits 25 and subsequently through the clearance 24 between the casing 28 and the column 22.

Of course, in every embodiment of the invention the piston may be replaced by equivalent means, such as e. g. a membrane or bellows, and while the claims hereinafter recite pistons, this term also includes alternative equivalents such as the membranes or bellows just mentioned.

The diameter of the piston 11 may be either larger or smaller than the exterior diameter of the column 22 or it may correspond to the same.

In case the two diameters are of even size, the space 26 may be very small or be entirely omitted. In this case also the slits 25 will prevent the efficiency of the apparatus from being influenced by the leakages. If it is, moreover, possible to do away with said leakages, e. g., by using a gasket, a membrane or the like whereby a sufficiently small resistance is offered to the movement, the apertures 25 and the space 26 may be omitted.

The effect of the weight of the control member may be promoted or replaced by other weights or springs, and it is, of course, possible to control the flow by adjusting these weights or the tension of the springs.

The automatic valve may be replaced by a slide valve, which is also possible with the adjusting hand valve. This latter valve may also be replaced by other known means for obtaining a difference in pressure from a flow of liquid, e. g., a fixed or an exchangeable member with an orifice, a set of Pitot tubes, etc.

In some cases the device may also constitute a part of another device, and the adjusting valve may then be mechanically adjusted in accordance with requirements.

It is self-evident that if a smaller quantity of liquid is fed to the apparatus than that for which it has been adjusted, it will become inactive. The control member will then sink entirely to the bottom and the automatic valve will allow the maximum passage.

As soon, however, as the flow of liquid increases once more to the quantity to which the apparatus has been adjusted, the same will become operative once more for the porpose of allowing the said quantity to pass through as a maximum. Consequently the apparatus is also suitable in those cases when a variable flow of liquid is to be limited to a maximum, without stopping but only limiting the flow, when this maximum is reached.

As described, the apparatus may be placed in one casing. It is also possible, however, if needed, to arrange the operative parts in two or more casings, connected with each other.

The connection between the space behind the adjusting valve and the space above the piston may also be arranged by bypassing the automatic valve.

The correct action of the device may be rendered visible by means of a double pressure gauge having two concentric pointers which are connected with the spaces below and above the piston.

One of the said pointers is set in such a way that the two pointers will coincide under the influence of the difference in pressure caused by the weight of the floating control member. The continuously coinciding pointers will then indicate the pressure prevailing at the inlet of the device.

As soon as the supply of liquid is stopped, or something gets out of order, the control member will no longer float freely, which is shown at once by the diversion of the two pointers.

I claim:

1. A constant flow control device, comprising a casing having inlet and outlet chambers and an orifice affording communication between said chambers, a handvalve to set a limited passage at one side of the orifice, and a cylinder connected to the said casing in which a piston works, to which piston is connected a hollow column, protruding from the cylinder into one of said chambers, having a valve edge to which the other side of the said orifice offers a seat and the inner space of which column communicates with one side of the cylinder, the other side of the cylinder communicating with the other of the said chambers, to keep the volume of flow of the fluid at a constant value, independently of the pressures prevailing in front of the said device and behind the same.

2. A device for adjusting a flow of fluid to a predetermined value and automatically keeping the said flow at the said value, comprising a valve casing having inlet and outlet chambers, a wall separating said chambers and provided with a valve seat upon both sides of an opening therein, an adjusting valve having a disc member, a balanced valve combined with the equivalent of a piston and provided with disc members, one of said valve seats cooperating with said first disc member and the other seat with one of the latter disc members, while one of the operative surfaces of said piston being exposed to the action of the pressure prevailing before said adjusting valve and the other operative surface of said piston of the pressure behind the same valve, and said balanced valve throttling the flow to a greater or a lesser degree in accordance with the increase or the decrease of the pressure difference prevailing in front of and to the rear of the adjusting valve, and acting on the two operating surfaces of the piston in order to keep said difference in pressure constant and maintain a constant flow.

3. A constant flow control device comprising a casing having inlet and outlet chambers, there being an orifice affording communication between said chambers, a handvalve for setting and controlling a limited passage at one side of the orifice, and a cylinder connected to the casing and having a reciprocable piston therein, a hollow column connected to the piston, said column protruding from the cylinder into one of said chambers and having a valve edge portion capable of seating against the other side of said orifice, the inner space of the column communicating with one side of the cylinder and the other side of the cylinder communicating with the other of said chambers and serving to keep the volume of the flow of fluid at a constant value.

4. A device for adjusting a flow of fluid to a predetermined value and automatically keeping the said flow at the said value, comprising a valve casing having inlet and outlet chambers, a wall separating said chambers and provided with a valve seat upon both sides of an opening therein an adjusting valve provided with a pointer and a scale having a disc member, a balanced valve combined with the equivalent of a piston and provided with disc members, one of said valve seats cooperating with said first disc member and the other seat with one of the latter disc members, while one of the operative surfaces of said piston being exposed to the action of the pressure prevailing before said adjusting valve and the other operative surface of said piston of the pressure behind the same valve, and said balanced valve throttling the flow to a greater or a lesser degree in accordance with the increase or the decrease of the pressure difference prevailing in front of and to the rear of the adjusting valve, and acting on the two operating surfaces of the piston in order to keep said difference in pressure constant and maintain a constant flow.

5. A constant flow control device comprising a casing having inlet and outlet chambers, there being an orifice affording communication between said chambers, a handvalve provided with a pointer and a scale for setting and controlling a limited passage at one side of the orifice, and a cylinder connected to the casing and having a reciprocable piston therein, a hollow column connected to the piston, said column protruding from the cylinder into one of said chambers, and having a valve edge portion capable of seating against the other side of said orifice, the inner space of the column communicating with one side of the cylinder and the other side of the cylinder communicating with the other of said chambers and serving to keep the volume of the flow of fluid at a constant value.

ANTOINE JOHAN BRUGMA.